United States Patent [19]

Lang et al.

[11] 4,312,013

[45] Jan. 19, 1982

[54] NON-LINEAR APERTURE CORRECTION CIRCUIT

[75] Inventors: Frank B. Lang, Princeton Junction; John J. Gibson, Princeton; Michael D. Ross, Somerdale, all of N.J.

[73] Assignee: RCA Corporation, New York, N.Y.

[21] Appl. No.: 75,331

[22] Filed: Sep. 19, 1979

[51] Int. Cl.³ .............................................. H04N 5/76
[52] U.S. Cl. .................................... 358/8; 358/128.5; 369/126
[58] Field of Search ................. 179/100.1 G, 100.1 B; 358/128.5, 128.6, 4, 8, 127; 360/30, 33; 369/126

[56] References Cited

U.S. PATENT DOCUMENTS

| 3,879,748 | 4/1975 | de Boer | 358/8 |
| 3,893,168 | 7/1975 | Bechly et al. | 358/8 |
| 3,930,117 | 12/1975 | Clemens et al. | 179/100.1 G |
| 3,934,263 | 1/1976 | Palmer | 358/4 |
| 3,984,867 | 10/1976 | Harnandez | 360/36 |
| 3,988,531 | 10/1976 | Laub | 358/128.5 |
| 3,988,532 | 10/1976 | Korpel | 358/128.5 |
| 4,110,784 | 8/1978 | Amery et al. | 358/8 |
| 4,141,033 | 2/1979 | de Boer | 358/8 |
| 4,142,208 | 2/1979 | Oprandi et al. | 358/127 |
| 4,150,395 | 4/1979 | Pritchard | 358/8 |
| 4,166,251 | 8/1979 | Ishigaki et al. | 329/132 |

FOREIGN PATENT DOCUMENTS

| 1013481 | 12/1965 | United Kingdom . |
| 1337397 | 11/1973 | United Kingdom . |
| 1379774 | 1/1975 | United Kingdom . |
| 1468611 | 3/1977 | United Kingdom . |
| 1473532 | 5/1977 | United Kingdom . |
| 1473533 | 5/1977 | United Kingdom . |
| 1495784 | 12/1977 | United Kingdom . |
| 1528138 | 10/1978 | United Kingdom . |
| 1528324 | 10/1978 | United Kingdom . |

OTHER PUBLICATIONS

Principles of Color TV, "Gama Connection", McIlwain et al, (1956) pp. 124–127.
Color TV, "Gama Connection", Carnt et al, vol. 1, (1961) pp. 84–86.

Primary Examiner—Raymond F. Cardillo, Jr
Attorney, Agent, or Firm—E. M. Whitacre; J. S. Tripoli; J. E. Roehling

[57] ABSTRACT

In a video disc system, geometric variations are recorded on the surface of the record and are representative of recorded picture and sound information. In a video disc playback apparatus for recovering picture and sound information from such a prerecorded record, a playback stylus is utilized to detect the geometric variations. Sound interference in the video signals may be produced by the non-linear characteristics of the playback stylus. A non-linear aperture correction circuit interposed between the playback stylus and the demodulator circuitry of the playback apparatus effects a substantial control of the intermodulation products.

10 Claims, 5 Drawing Figures

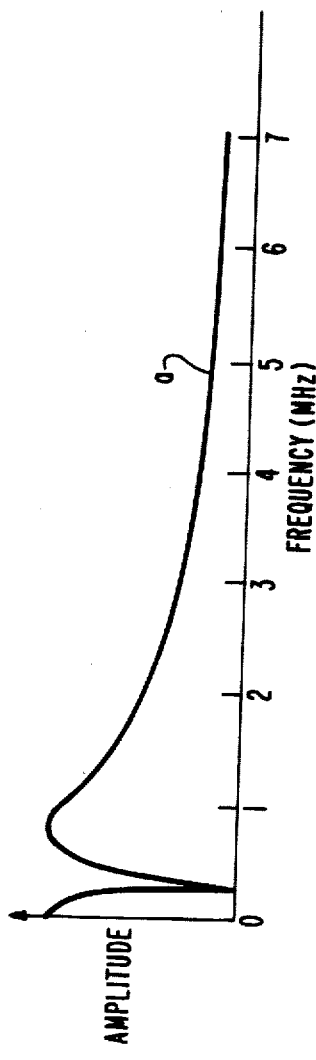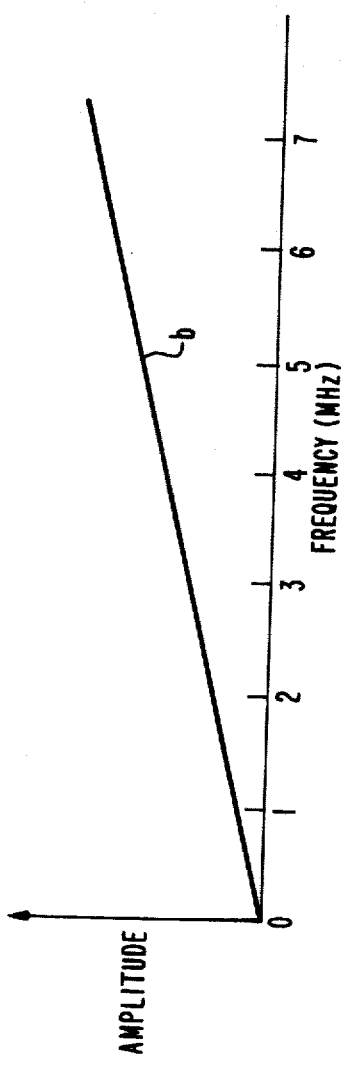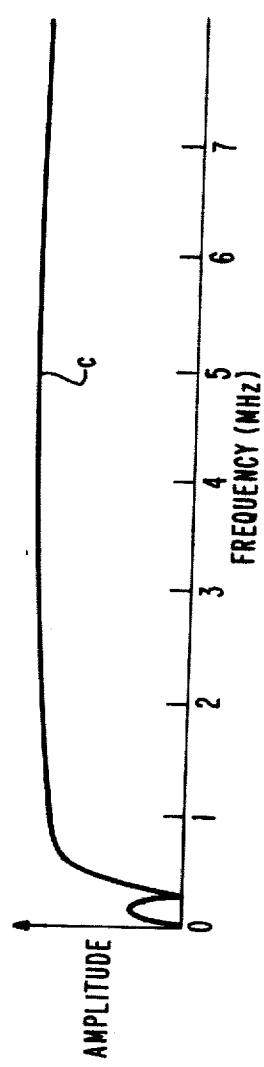

NON-LINEAR APERTURE CORRECTION CIRCUIT

The present invention relates generally to apparatus for reproducing information from a record medium and more particularly to playback apparatus for reproducing video and audio information from a disc record.

In U.S. Pat. No. 3,842,194, issued on Oct. 15, 1974 to Jon K. Clemens, video disc playback systems of a variable capacitance form are disclosed. In an arrangement therein described, an information track incorporates geometric variations in the bottom of a spiral groove in a disc which may have a surface comprising conductive material covered with a thin coating of dielectric material. In another format, not disclosed in the Clemens' patent, the disc may be formed of a conductive material, such as carbon, in a PVC base.

In one format employed for the grooved information track disclosed in the Clemens' patent, depressed areas extending across the bottom of the groove alternate with non-depressed areas, with the frequency of alternation varying with the amplitude of the video and audio signals. Variations in the capacitance presented between a conductive electrode on a tracking stylus and the conductive material of the disc occur as the disc is rotated by a supporting turntable; the capacitance variations are sensed to recover the recorded information.

The recording of a composite colored video signal with stereo sound accompaniment may be achieved when the accompanying audio signals are caused to frequency modulate low frequency sound carriers over a low frequency deviation range (illustratively, 716±50 KHz and 905±50 KHz). In a picture modulator, a composite color video signal (including luminance signals occupying a given band of frequencies and chrominance signals appearing as side band components of a modulated chrominance subcarrier interleaved with luminance signal components in an intermediate region of the given band) is caused to frequency modulate a high frequency picture carrier over a high frequency deviation range (illustratively, 4.3–6.3 MHz). The peak-to-peak amplitude of the sound modulator output is held at a level which is small relative to the peak-to-peak amplitude level of the picture modulator output, with an illustrative level ratio being 1:10. The respective modulated carriers are combined in a linear adder and applied to a recorder which may be an electromechanical, optical or electron beam recorder controlled in response to the signal developed by the adder. The recorder is used to record the composite signal on a disc master.

Under certain circumstances, sound interference in the video reproduction may be encountered during playback of a video disc record embodying the aforementioned format. It is believed that this sound distortion is caused by the playback transducer.

One embodiment of a stylus assembly, described in the Clemens' patent, comprises a dielectric mounting structure (e.g., sapphire or diamond) having a conducting element deposited on the rear surface thereof. Capacitance variations between the stylus assembly and the disc are detected by this one electrode. As the stylus assembly tracks the groove in the disc, variations in the spacing between the stylus bottom and the groove bottom are sensed. Since the signal recorded in the groove bottom consists of the linear sum of high and low frequency signals, the groove bottom may be described as a low frequency, slowly varying audio carrier with a high frequency video signal superimposed thereon. It is felt that the asymmetric form of the stylus assembly effects a concentration of the electric field on the dielectric side of the conductive element such that the stylus effectively "sees" the signal at an angle skewed forward rather than directly beneath the conductive tip. Further, the stylus rests on the high peaks of the audio signal and does not track into the valleys. Since the stylus rides on the sound peaks, it senses the video more in the future when the stylus is over a sound valley than it does when it rides over a sound peak, thus, effecting primarily a phase modulation of the recovered video signal by the audio.

In U.S. Pat. No. 3,934,263, issued on Jan. 20, 1976 to R. C. Palmer, a reduction of the undesired sound interferences is effected by a deliberate introduction of a selected amount of phase modulation of the picture information by the sound information in the course of recording the information signal on a master disc. This technique is effective in reducing the sound interference, however, replica discs stamped from molds produced from these masters may not be compatible with other playback transducers (e.g., pressure or optical).

In U.S. patent application, Ser. No. 951,382, filed on Oct. 16, 1978, now abandoned in favor of continuation-in-part application Ser. No. 75,330 filed concurrently herewith, for J. J. Gibson, a non-linear aperture corrector for reducing sound distortion in the video is provided in the video disc playback apparatus. In one embodiment described therein, the non-linear aperture corrector comprises the parallel combination of a diode and a capacitor which effects on the average a decrease of about 9 db in the maximum sound beat.

The non-linear aperture corrector which comprises the parallel combination of a diode and a capacitor has provided effective removal of quadratic intermodulation products but does not necessarily provide effective control of higher order intermodulation products. To effect a substantial removal of the higher order intermodulation products, a balanced arrangement for the non-linear aperture corrector is provided. In this balanced arrangement, odd order intermodulation products are substantially eliminated by providing two non-linear signal paths. The signals recovered by the recovery means are influenced by both non-linear signal paths. In the first signal path the signals are inverted while in the second they are not. Thus, when the signals from the first signal path are combined (e.g., in a linear adder) with signals from the second, odd order intermodulated products are substantially removed.

In accordance with the principles of the present invention, a non-linear aperture corrector which, in some cases, further reduces the sound beat is provided in the playback apparatus.

In the accompanying drawings:

FIG. 3a illustrates the frequency response of the signal shaping network of FIG. 2;

FIG. 3b illustrates the frequency response of the differentiator of FIG. 2; and

FIG. 3c illustrates the overall frequency response of the non-linear aperture corrector of FIG. 2.

Figure 1:
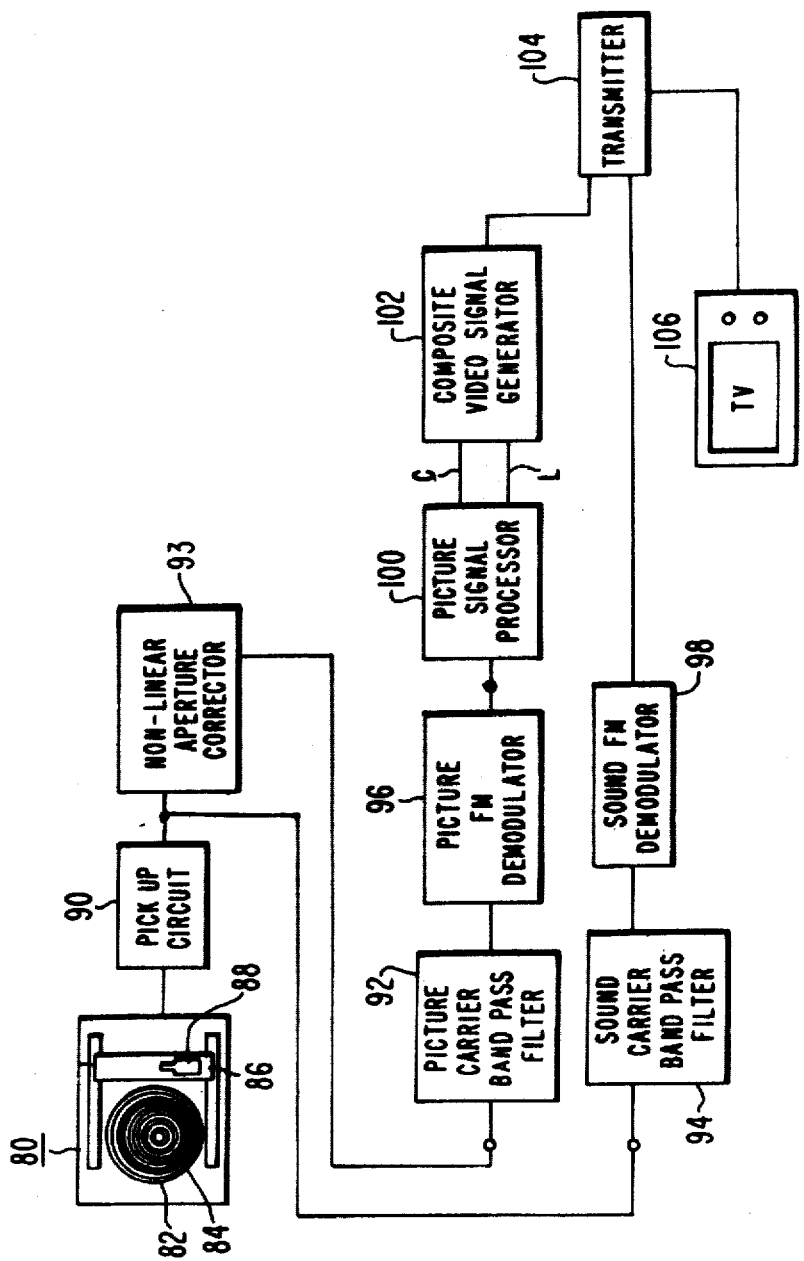
FIG. 1 illustrates, via a block diagram representation, playback apparatus, including a non-linear aperture correction stage, embodying the principles of the present invention.

Referring now to FIG. 1, a video disc player 80 (e.g., of the type shown in the above-mentioned Clemens' patent) has a turntable 82 for rotatably supporting a video disc 84 having a spiral information track containing video signal information with sound signal information accompaniment. The player 80 further includes a carriage 86 which is subject to translation in synchronism with the radial motion of the player stylus during playback. The carriage 86 has a compartment for receiving a cartridge 88 which houses the signal pickup stylus.

A pickup circuit 90 responsive to the output of the signal pickup, develops at its output terminal, a signal representative of the recorded information. The signal at the output terminal of pickup circuit 90 may contain sound interference in the video. The pickup circuit 90 is illustratively of the type described in U.S. Pat. No. 4,070,625, issued on Mar. 21, 1978 to Kawamoto, et al.

The output of the pickup circuit 90 is delivered to a non-linear aperture corrector 93 and sound carrier bandpass filter 94. The aperture corrector reduces the interference effected by the non-linear response of the recovery means. A specific embodiment of aperture corrector 93 will be discussed with reference to FIG. 2, infra.

The output of the non-linear aperture corrector 93 is delivered to bandpass filter 92. The picture carrier bandpass filter 92 has a relatively wide pass band encompassing the deviation range of the high frequency picture carrier (e.g., 4.3–6.3 MHz) as well as the requisite adjacent side band regions, and selectively passes the picture carrier component of the recorded signal to the relative exclusion of the sound carrier component thereof.

The sound carrier bandpass filter 94 has a relatively narrow pass band encompassing the deviation range of the low frequency sound carriers (e.g., 716 and 905 KHz) as well as requisite adjacent side band regions, and selectively passes the sound carrier components of the recorded signal to the relative exclusion of the picture carrier component.

The outputs of the respective bandpass filters 92 and 94 are passed to respective demodulators 96 and 98. The picture demodulator 96 develops at its output terminal the recorded picture signal information inclusive of synchronizing components and, the sound demodulator 98 develops at its output the recorded audio signal information.

A picture signal processor 100, coupled to the picture demodulator 96, effects a separation of the chrominance information from the luminance information. A composite video signal generator 102 recombines the chrominance and the luminance information in accordance with, for example, the NTSC format. A transmitter 104 processes the sound, luminance and chrominance information to form a suitable signal for delivery to a color TV receiver 106. Receiver 106 then displays the color image and provides the audio information developed in accordance with the information signal previously recorded on video disc 84. Illustratively, when the signal delivery to the antenna terminals of a color TV receiver is desired, the circuits in transmitter 104 include means for combining the separated components to form a new composite signal, which composite signal modulates a suitable RF carrier. U.S. Pat. No. 4,097,899, issued on June 27, 1978 to J. P. Yu, illustratively describes a transmitter apparatus useful for providing the functions of transmitter 104.

Figure 2:
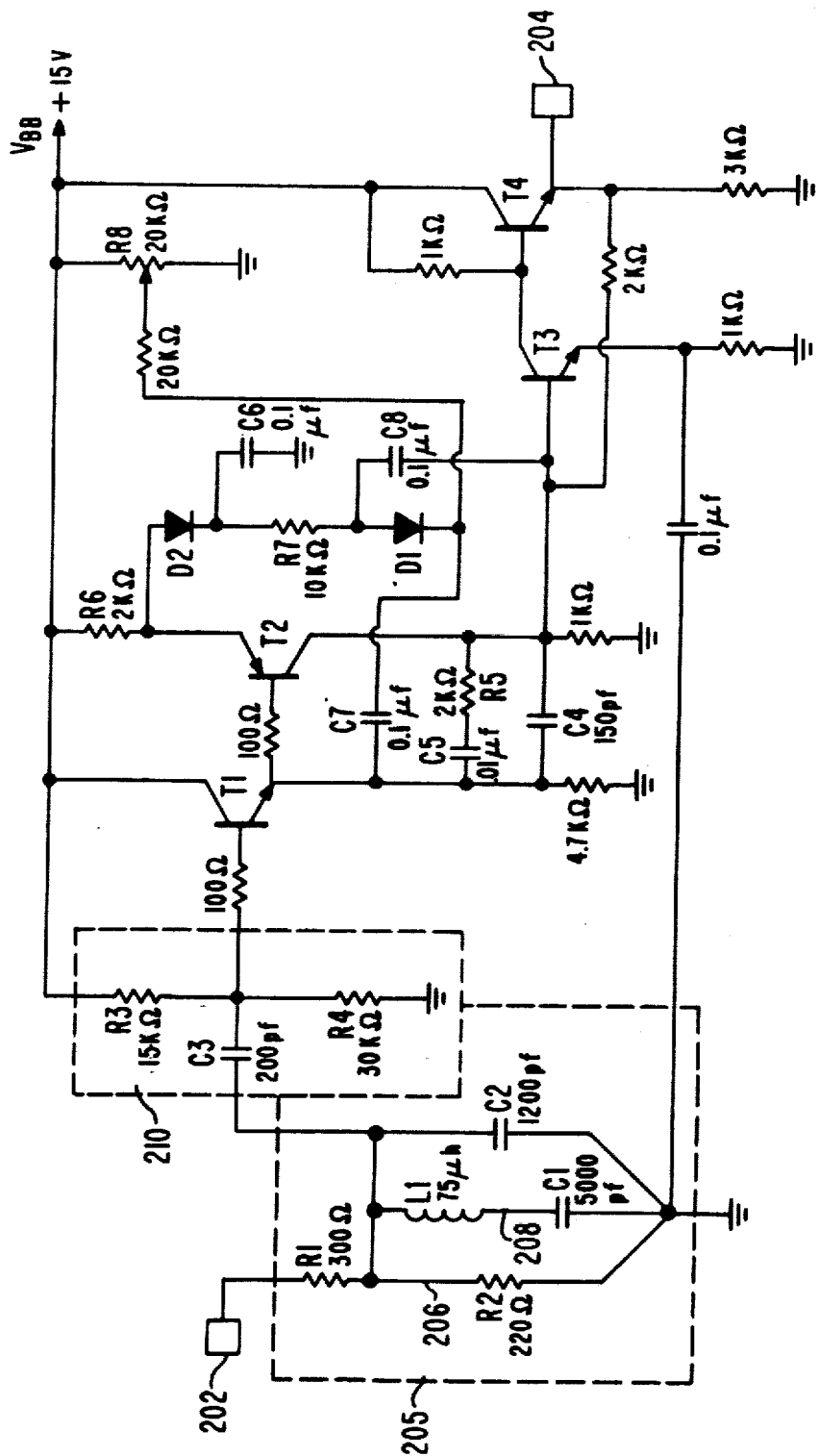
FIG. 2 is a schematic diagram of an embodiment of the non-linear aperture corrector of FIG. 1.

FIG. 2 illustrates an embodiment for the non-linear aperture corrector 93 of FIG. 1. The output signal from pickup circuit 90 of FIG. 1 is applied to input terminal 202 of FIG. 2 and output terminal 204 of FIG. 2 is coupled to picture carrier bandpass filter 92 of FIG. 1.

Referring to FIG. 2, input terminal 202 is provided to input network 205, i.e., signal shaping circuit. Voltage divider 206, within input network 205, comprises resistors R1 and R2 connected in series. Trap filter 208, which comprises inductor L1 and capacitor C1 connected in series, is connected in parallel with resistor R2 of divider 206. In parallel combination with resistor R2 and trap 208 is capacitor C2.

High pass filter 210, which includes capacitor C3 and resistors R3 and R4, is connected to the output of input network 205 and emitter follower transistor T1 has its base electrode coupled to the output of high pass filter 210 via a small (100 ohm) resistor.

The currents from four signal paths are summed at the base of transistor T3 (of the feedback transistor pair comprising T3 and T4, i.e., amplifier). The first path which is the main path for the video signal connects the emitter of emitter followers T1 through capacitor C4 with the base of transistor T3. The second path includes diode D1 which is a non-linear device and capacitors C7 and C8. The second path provides one of the two legs of a balanced non-linear aperture corrector. The PNP transistor T2 is included in the third path. Diode D2, which is connected to the emitter of inverter transistor T2, provides a non-linear impedance which changes the gain of transistor T2 in a non-linear fashion. The path from the emitter of emitter-follower T1 through the inverter stage T2 to the summing point, the base of transistor T3, provides the second leg of the balanced non-linear aperture corrector. The fourth path is provided through the series connection of capacitor C5 and resistor R5. This last signal path is present to compensate for the signal of opposite polarity which flows through resistor R6 and the emitter electrode of transistor T2. If the current source were ideal, signal path four could be eliminated.

The cathode of diode D2 is connected to the anode of diode D1 through resistor R7 and the cathode of diode D1 is connected to the slider arm of potentiometer R8 through a resistor. A positive bias voltage is applied to the anode of diode D1 through resistor R6. Additionally, the cathode of diode D2 is connected to ground through a signal path which includes capacitor C6. Capacitor C7 is connected between the emitter of transistor T1 and the cathode of diode D1 and capacitor C8 is connected between the anode of diode D1 to the summing point at the base of transistor T3.

In operation, the output from pickup circuit 90 of FIG. 1 contains non-linear distortions which may result in sound signal interference in the video output display. The non-linear aperture corrector of FIG. 2 effects a substantial removal of these non-linearities. The divider network 206, which is connected to input terminal 202 reduces the level of the input signal so that the signal across the diodes is less than 100 mv peak-to-peak to effect diode operation within the "knee" of their respective response curves. Further, divider 206 provides a resistive source impedance for input network 205. Trap filter 208 is arranged to remove control signals of a particular frequency (e.g., 260 KHz). Above the resonant frequency of trap filter 208, inductor L1 becomes the dominating reactance element and resonates in parallel with capacitor C2 at a frequency which is in the vicinity of the sound carriers (e.g., 715 and 905 KHz). The relative phase of the sound carriers and the video carrier must be controlled to provide proper phase alignment. Thus, capacitor C2 is provided to establish proper phasing of the sound carriers. Above the sound carrier frequencies capacitor C2 dominates and network 205 functions as an integrator. Network 205 provides approximately a 6 db/octave slope for all of the video information, reduces the amplitude of the video and shifts the phase of the video carrier by nearly 90°. The linear transfer characteristic for network 205 is shown by curve "a" of FIG. 3a.

The next section which is the high pass filter 210 has a low frequency cutoff (e.g., 80 KHz). Any low frequency noise which may cause unwanted phase modulation in the video carrier is filtered out in this stage.

The non-linear aperture correction stage comprises diodes D1 and D2, inverter transistor T2 and capacitor C4. Diodes D1 and D2 are isolated from each other with respect to an AC signal by resistor R7 and capacitors C6, C7 and C8. Nevertheless, as noted above, these diodes, arranged in series, may be bias controlled by a single potentiometer R8. Diodes D1 and D2 are arranged with respect to an AC signal in a balanced configuration such that odd order sound distortions of the video are reduced or eliminated. Since diodes D1 and D2 are biased with the same biasing current odd order distortions in the signal which are passed through the collector of transistor T2 to the summing point at the base of transistor T3 are balanced with odd order distortions which are passed through diode D1 to the summing point at the base of transistor T3. With the odd order distortions through diode D1 180° out of phase with the odd order distortions through the collector of transistor T2 all odd order distortions are substantially eliminated.

Simultaneously, even order distortions are substantially eliminated by the modulating effect of the combination of the two non-linear and one linear signal paths. The capacitor C4 in combination with transistor feedback pair T3 and T4 effects a differentiation of the video signal which shifts its phase by approximately 90°. The linear transfer characteristic for the differentiator (i.e., capacitor C4 and transistor feedback pair T3 and T4) is illustrated by curve "b" of FIG. 3b. Taking the signal at the emitter of T1 as a reference phase, it can be seen that the non-linear elements D1 and D2 pass the video carrier to the summing node (base of T3) either with the same polarity through D1 for negative portions of the audio carriers or inverted through T2 for positive portions of the audio carrier. Thus, the non-linear elements may be considered to be generating intermodulation products that are in phase with the signal at the emitter of T1. The reactance of C4 causes the main signal at the summing node to be in quadrature to the main signal at the emitter of T1 and therefore in quadrature with respect to the intermodulation products generated by D1 and D2. The result is phase modulation of the video carrier by the audio carriers. The amplitude of the intermodulation products produced and therefore the amount of phase modulation is a function of the diode bias current which may be adjusted such that the phase modulation effected in diodes D1 and D2 substantially cancels the phase modulation effected by the non-linear recovery means.

For another explanation of the operation of the non-linear aperture corrector consider a signal S(t) having even order intermodulation products produced by the recovery means at the emitter of transistor T1. The diodes D1 and D2 will contribute even order distortion components (i.e., $S^2(t)$) which are "in phase" with the signal S(t). In particular, the diode currents will contain audio side bands to the video carrier (i.e., signals at $5 \pm 0.715$ MHz and $5 \pm 0.905$ MHz). Simultaneously, the main video signal is conveyed through capacitor C4 in quadrature with the signal S(t) at the emitter of transistor T1. The combination of these signals at the summing node (i.e., base of transistor T3) contains substantially no intermodulation products since the side bands generated by diodes D1 and D2 effectively cancel the side bands which were generated in the original signal by the non-linear recovery device.

The integration provided by network 205 complements the differentiation effected in capacitor C4 to produce a nearly flat response for the non-linear aperture corrector. Curve "c" of FIG. 3c demonstrates the overall response of the non-linear aperture corrector of FIG. 2.

It should be noted that a negative-going signal from pickup circuit 90 of FIG. 1 will effect a phase retardation in the non-linear aperture corrector of FIG. 2. The operation of the non-linear aperture corrector is dependent upon the polarity of the signal from pickup 90 of FIG. 1. It will be appreciated that when the polarity of the input signal to the aperture corrector is more positive for a sound peak than a sound valley, the aperture corrector should be arranged to effect a phase advance as the input signal goes more positive (e.g., as arranged in FIG. 2). But, when the polarity of the signal output from pickup 90 of FIG. 1 is more negative for a sound peak than a sound valley, the diode arrangement of the aperture corrector should be altered to effect a phase advance as the input signal to the aperture corrector goes more negative.

It will be appreciated that the non-linear aperture corrector circuit may be implemented by other techniques. For example, the integrator could be arranged after the differentiator rather than before. However, there are certain advantages in arranging the integrator as shown in FIG. 2; that is, its effect on the ratio of the amplitude of video and audio signals prior to passing them through the non-linear aperture corrector. First, by reducing the amplitude of the video carrier, the diodes are operated over a smooth section of their non-linear characteristics, i.e., the diodes never cut off. Secondly, the modulation of the sound beat is better controlled. The audio carriers are attenuated by the ratio of resistors R1 and R2 while the video carrier is attenuated by the ratio of the resistors times the integration effect of the integrator. Increasing the amplitude of the audio carriers with respect to the amplitude of the video carrier effects more modulation with less distortion of the video carrier.

It will be further appreciated that the input circuit and feedback pair of transistors may be implemented with a balanced or non-balanced non-linear aperture corrector.

Additionally, it should be appreciated that the specific balanced arrangement as described with reference to FIG. 2 may be implemented by other means. For example, the inversion of the balanced signal may be effected after modulation of the signal rather than before.

What is claimed is:

1. In a disc record player for information recovery of video and sound signals, an apparatus including: means for recovering modulated information signals including composite color video signals with sound accompaniment from a disc record, said recovery means having a non-linear response which produces intermodulation products between said video and sound signals; means for demodulating said information signals; means, coupled to said demodulating means, for processing said demodulated signal; and means, connected to said recovery means, for providing compensation for said intermodulation products produced by said recovery means, said means for providing compensation comprising:
- a signal shaping circuit connected to said recovery means including;
- means for reducing the level of the modulated information signals and for providing a resistive source impedance;
- means for rejecting a signal of a given frequency; and
- means for shifting the phase of the modulated information signals;
- an amplifier;
- a non-linear signal path connecting the output of said signal shaping circuit to the input of said amplifier; and
- a linear signal path connected in parallel arrangement with said non-linear path.

2. The apparatus in accordance with claim 1
- wherein said means for reducing includes a voltage divider having first and second resistive elements;
- wherein said means for rejecting includes a trap filter connected in parallel combination with said second resistive element of said voltage divider, said trap filter comprising first and second reactive elements; and
- wherein said means for shifting includes a thhird reactive element, connected in parallel combination with said trap filter;
- said third reactive element in combination with said first reactive element of said trap filter effecting a phase shift of said sound signals, and, said third reactive element in combination with said first resistive element of said voltage divider effecting an integration of said video signals.

3. The apparatus in accordance with claim 2 wherein said linear signal path effects a differentiation of the video signals which pass therethrough; said differentiation being complementary to said integration effected in said signal shaping circuit.

4. The apparatus in accordance with claim 3 further comprising an emitter follower transistor connected to said signal shaping circuit.

5. The apparatus in accordance with claim 4 further comprising a high pass filter, connected to said signal shaping circuit, for reducing low frequency noise.

6. In a disc record player for information recovery of video and sound signals, an apparatus including: means for recovering modulated information signals including composite color video signals with sound accompaniment from a disc record, said recovery means having a non-linear response which produces intermodulation products between said video and sound signals; means for demodulating said information signals; means, coupled to said demodulating means, for processing said demodulated signals; and means, connected to said recovery means, for providing compensation for said intermodulation products produced by said recovery means, said means for providing compensation comprising:
- a first non-linear signal path for transferring signals recovered from said recovery means;
- a second non-linear signal path for transferring signals recovered from said recovery means;
- a linear signal path for transferring signals recovered from said recovery means;
- means for inverting the polarity of the signal which passes through said first non-linear path; and
- means for summing the output signals from said first non-linear signal path, said second non-linear signal path and said linear signal path.

7. The apparatus according to claim 6 wherein said inverting means comprises a transistor and wherein said transistor is coupled to a diode, said diode providing a non-linear impedance in response to the amplitude of the signal from said recovery means; said non-linear impedance affecting the gain of said transistor in a non-linear fashion.

8. In a disc record player for information recovery of video and sound signals, an apparatus including: means for recovering modulated information signals including composite color video signals with sound accompaniment from a disc record, said recovery means having a non-linear response which produces intermodulation products between said video and sound signals; means for demodulating said information signals; means, coupled to said demodulating means, for processing said demodulated signals; and means, connected to said recovery means, for providing compensation for said intermodulation products produced by said recovery means, said means for providing compensation comprising:
- an emitter follower transistor;
- means for combining;
- a first non-linear signal path connecting the emitter electrode of said emitter follower to an input of said amplifier; said first non-linear signal path comprising a first diode; and
- a second non-linear signal path connected to an input of said amplifier; said second non-linear signal path including an inverter transistor having a second diode connected thereto, said second diode altering the gain of said inverter transistor in a non-linear fashion;
- a bias means, connected to the anode of said second diode, providing equal bias current to said first and second diodes;
- said means for combining being used to sum the signals passing through said first non-linear signal path with the signals passing through said second non-linear signal path.

9. The apparatus according to claim 8 wherein said bias means comprises a potentiometer.

10. The apparatus according to claim 9 further comprising:
- a resistor coupled between the cathode of said second diode and the anode of said first diode;
- a first capacitor coupling the cathode of said second diode to a first point of reference potential;
- a second capacitor coupling the emitter of said emitter follower to the cathode of said first diode; and
- a third capacitor coupling the anode of said first diode to said input of said amplifier.

* * * * *